United States Patent [19]

Yasrebi

[11] Patent Number: 6,141,689
[45] Date of Patent: Oct. 31, 2000

[54] METHOD AND MECHANISM FOR ALLOCATING SWITCHED COMMUNICATIONS PORTS IN A HETEROGENEOUS DATA PROCESSING NETWORK GATEWAY

[75] Inventor: Mehrad Yasrebi, Scarborough, Canada

[73] Assignee: International Business Machines Corp., Armonk, N.Y.

[21] Appl. No.: 08/782,774

[22] Filed: Dec. 12, 1996

Related U.S. Application Data

[63] Continuation of application No. 08/130,598, Oct. 1, 1993, abandoned.

[51] Int. Cl.$^7$ ........................................................ G06F 15/16
[52] U.S. Cl. .......................................................... 709/228
[58] Field of Search .................................. 709/227–229, 709/217–219, 237, 238, 249, 250, 302, 304

[56] References Cited

U.S. PATENT DOCUMENTS

| | | | |
|---|---|---|---|
| 4,417,244 | 11/1983 | Melas .................................... | 340/825.8 |
| 4,896,319 | 1/1990 | Lidinsky et al. ........................ | 370/60 |
| 4,897,874 | 1/1990 | Lidinsky et al. ........................ | 380/3 |
| 4,901,231 | 2/1990 | Bishop et al. .......................... | 395/325 |
| 4,914,653 | 4/1990 | Bishop et al. .......................... | 370/85.6 |
| 4,958,341 | 9/1990 | Hemmady et al. ..................... | 370/60.1 |
| 4,972,368 | 11/1990 | O'Brien et al. ......................... | 364/900 |
| 5,117,429 | 5/1992 | Lagoutte .................................. | 370/60 |
| 5,144,293 | 9/1992 | Rouse .................................. | 340/825.02 |
| 5,179,702 | 1/1993 | Spix et al. ............................. | 395/650 |
| 5,247,616 | 9/1993 | Berggren ............................. | 395/200.08 |
| 5,280,503 | 1/1994 | Betts .................................... | 375/121 |
| 5,371,852 | 12/1994 | Attanasio et al. ..................... | 395/200 |
| 5,425,028 | 6/1995 | Britton et al. ......................... | 370/94.1 |
| 5,426,427 | 6/1995 | Chinnock et al. ..................... | 340/827 |
| 5,444,703 | 8/1995 | Gagliardi et al. ..................... | 370/60.1 |
| 5,463,625 | 10/1995 | Yasrebi ................................ | 370/401 |

FOREIGN PATENT DOCUMENTS 9216079  9/1992  WIPO .

OTHER PUBLICATIONS

IBM TDB, No. 2, 7–92, p. 404–407; "A Priority Mechanism for Flow–Control . . . ", 1983 Conf. Proceedings, Phoenix, AZ, Mar. 14–16, 1983.
Analyzing Novell Networks, p 259–261.
Intro. to OSF DCE, p ix–3–20.
LAN Times, Dec. 30, 1991, vol. 8, iss. 24.
Netware Buyers Guide, p. 3–132–3–136.
Netware Asynchronous Services Interface, p 1–A–10.
Distributed Systems Concepts & Design, p 1–113.

*Primary Examiner*—John Follansbee
*Attorney, Agent, or Firm*—Jerry W. Herndon

[57] ABSTRACT

In a distributed computer network where a gateway device is provided having multiple switched communications ports, a mechanism for allocating access to the switched ports between outgoing and incoming calls is provided. A remote procedure call facility in the distributed system is modified with an interface mechanism having a pool of virtual handles or software images of physical ports. On receiving a remote procedure call for a switched communications, one of the virtual handles is returned. It is only when a physical switched communications link is actually necessary, as indicated by the return of the virtual handle to the gateway device, that a port is located and the remote procedure call bound to it for attempting a call. If no port is available at that time, an error code is returned. Otherwise, a return code is generated that is consistent with the result of the call attempt. As the number of virtual handles can far exceed the actual number of ports, many clients to the gateway device can be satisfied concurrently, despite the occupation of all of the ports.

9 Claims, 8 Drawing Sheets

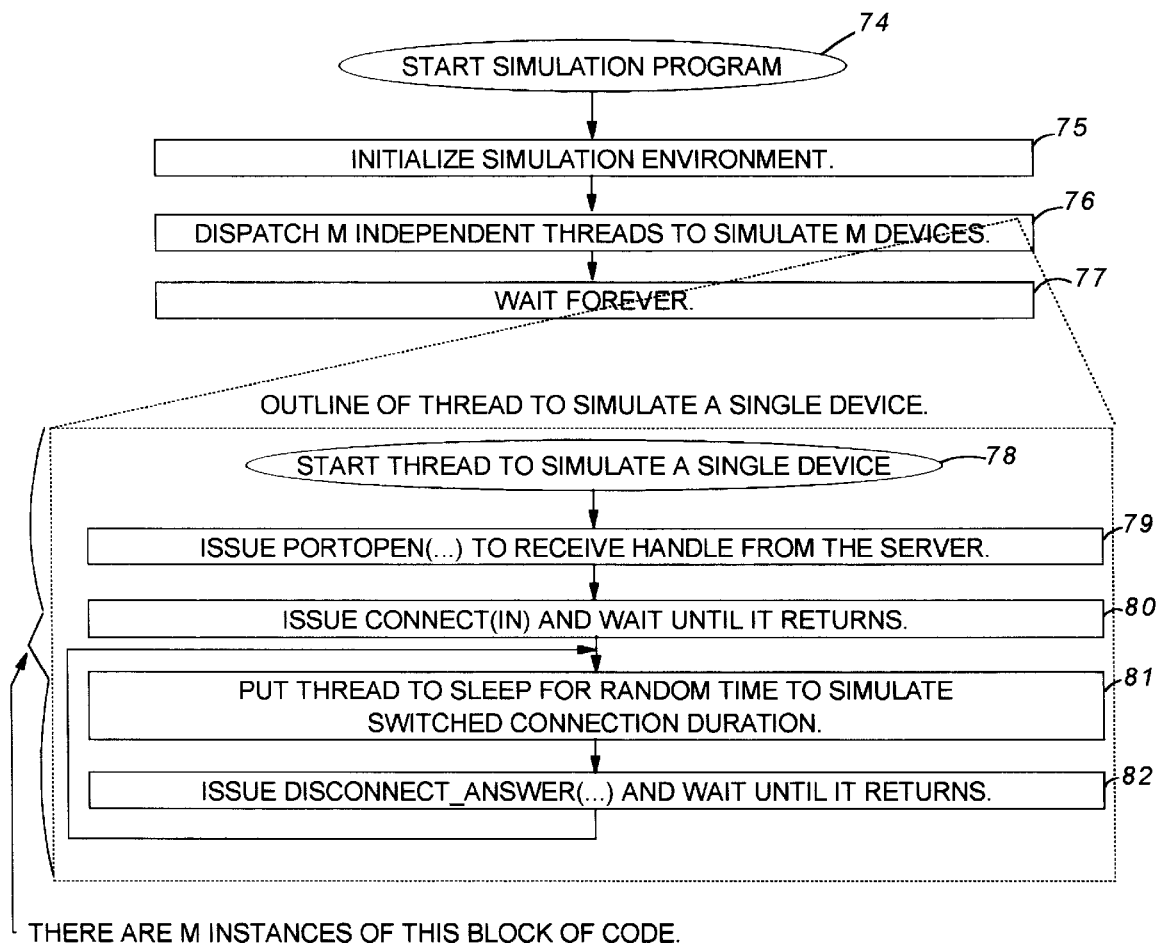

METHOD AND MECHANISM FOR ALLOCATING SWITCHED COMMUNICATIONS PORTS IN A HETEROGENEOUS DATA PROCESSING NETWORK GATEWAY

This is a continuation of application Ser. No. 08/130,598 filed Oct. 1, 1993, now abandoned.

CROSS-REFERENCES TO RELATED APPLICATIONS

The contents of co-pending application Ser. No. 08/131, 059, entitled HIGH PERFORMANCE MACHINE FOR SWITCHED COMMUNICATIONS IN A HETEROGENEOUS DATA PROCESSING NETWORK GATEWAY, are hereby incorporated by reference as non-essential material.

FIELD OF THE INVENTION

This invention relates to the distributed system environment, and provides, in particular, a method and an interface mechanism for allocating switched communications links from a distributed system, such as a local area network (LAN) through a gateway device to a switched network such as a switched wide area network (WAN).

BACKGROUND OF THE INVENTION

A distributed system is, broadly speaking, an aggregate of individual systems that are connected via electronic communications. The separation of components inherent in a distributed system provides advantages over a tightly integrated system approach in allowing the truly parallel execution of programs, the containment of faults without system disruption, and the use of isolation and interlocks as security enforcement measures.

A LAN is a type of distributed system that loosely couples remote processors and workstations. Generally, workstations on a LAN do not share a central memory, but do share common servers such as one or more file servers, print servers, etc. High-speed LANs, in particular, effectively increase the power and flexibility of workstations (computers designed for one or more single users with sufficient processing power and memory to run users' application programs) by enabling them to have access to shared data and resources located in their own and other server computers.

The LAN system that has been in the widest use in recent years is produced by Novell, Inc. of Provo, Utah, and is marketed under the trademark Novell. In a Novell system, a LAN device driver is implemented on top of the local operating systems to be coupled, and device driver commands (and responses) at the LAN workstations are directed from (and to) the workstations onto the LAN to (and from) the target servers.

As the users of personal computers and workstations, as well as minicomputers, mainframes and supercomputers, try to take better advantage of their combined resources, LANs are being grown with disparate (i.e., heterogeneous) systems made up of the variety of hardware, software and applications already installed.

However, network access and connectivity alone are not sufficient to perform useful work between disparate systems on a LAN. These components must have a common understanding of the particular type of work or application to interoperate. They must also utilise the same procedures to implement that type of work. One level of interoperability is to establish terminal emulation to access applications on other systems. Another option is to use a batch file transfer mechanism to transfer data to another machine, where a program will parse the data and perform work on it according to a pre-established protocol. Both of these mechanism require system specific software that is not portable without modification, for connecting other types of hardware and/or operating systems.

One goal of developments in distributed systems is to develop means for providing interoperability that is more universal (portable to a larger number of computers and/or operating system types), while maintaining transparency (concealment of separation) to the user (whether that user is a machine or application). Ideally, the user should not be aware of accessing resources on remote servers in a LAN, but should perceive the system as a whole rather than as a collection of individual components.

In a homogeneous distributed system, such as the Novell Netware[1] LAN, each separate computer has the same operating system and identical software hierarchy. This is referred to as the Netware Asynchronous Service Interface (NASI). The LAN device driver contains facilities for communications between processes in separate computers. The target Novell server runs the Netware Asynchronous Communications Server (NACS).

[1]Trademark of Novell, Inc.

The Distributed Computing Environment (DCE) of the Open Software Foundation (OSF[2]) is a very recent emerging technology enabling distributed computer among heterogeneous systems. When implemented on each of the disparate systems, DCE allows transparent interoperation between computers on the LAN through a mechanism called the remote procedure call (RPC) that extends to the distributed environment the concept of a local procedure call, a well understood communications mechanism for constructing a program using subroutines (also called subprograms or procedures) within an operating system. The RPC mechanism is implemented in DCE in conjunction with a multi-threading capability similar to that described in the IEEE POSIX 1003.4a draft standard[3]. This combination permits RPC concurrency in the OSF DCE environment.

[2]Trademarks of the Open Software Foundation
[3]IEEE P1003.4a/D4 draft standard, *Threads Extension for Portable Operating Systems*, Technical Committee on Operating Systems of the Institute of Electrical and Electronic Engineers (IEEE) Computer Society, New York, N.Y., USA, Aug. 10, 1990.

Normally, in the absence of an RPC mechanism, there is a unique interface between the calling program and a specific subroutine, and the local procedure call invokes all necessary logic for operability. When the subroutine resides on a different machine than the calling program, communications logic (i.e., the location of the subroutine, data conversions, etc.) is required for the call and must be hard-coded into the calling and/or called programs.

In OSF's DCE, the RPC itself automatically invokes the communications services for the programmer, and all, or optionally almost all, communications code, error handling and data conversion are handled transparently, thereby removing concern for the communications mechanisms from the programs that use remote procedures.

In the DCE system, for each subroutine call, the RPC mechanism can automatically invoke a directory that provides naming and other support protocols for every resource in the network. Thus, application programs can make use of distributed services by issuing calls to remote procedures by name, without knowing their location(s). This provides location transparency, as the distributed system is completely configurable in terms of the location of its components. As described above, the RPC mechanism also permits heterogeneity in the DCE environment.

The increasing proliferation of remote electronic information exchange has made access to remote servers such as processors and databases a necessity. This access is often facilitated through circuit-switched communications links over wide area networks (WANs).

A useful description of a typical switched area network of this type is that described in U.S. Pat. Nos. 4,896,319, 4,897,874 and 4,958,341, all to AT&T, that relate to a "metropolitan area network" (MAN). The switches described in these patents are similar to those typically used for WANs, although the protocols for the type of system specified appears to be directed to the secure transmission of data.

As described in my concurrently filed application titled HIGH PERFORMANCE MACHINE FOR SWITCHED COMMUNICATIONS IN A HETEROGENEOUS DATA PROCESSING NETWORK GATEWAY (U.S. Pat. No. 5,463,625), the contents of which are hereby incorporated herein by reference, the typical mechanism used for instituting access to or from a remote machine across a WAN from (or to) a workstation on a LAN is through a switched communications link at a LAN gateway server. A device driver for the gateway is provided with physical ports (or modems) that can be linked to switched communications WANs.

Existing gateway mechanisms, such as Novell's NACS and NASI, are generally implemented on top of the LAN device driver as a switched communications device interface and a LAN redirection facility on the workstation programming interface, and a corresponding LAN redirection facility and switched communications device interface implemented at the gateway, providing for both the transmission and receipt of switched communications links through the gateway modems. Redirections are also used for communicating serial port and modem commands between the gateway and other machines on the LAN.

In such systems, the user's initialization of the communications link-up procedure redirects the user hardware commands to the gateway. The communications interface in the gateway driver then institutes and maintains the switched communications link, diverting hardware resources of the driver to do so. An exclusive device driver access mode would typically be used in accessing the remote ports. The connection and access procedures are then executed using the gateway ports and modems in order to link the user's system with the switched communications network. A remote connection is established through the WAN. This sets up a point-to-point configuration through the port along the communication line between the user computer and server computer, monopolizing the switched communications device in use.

The device driver interface is hardware-oriented, and imposes the restriction that the device drivers in the workstations and LANs support compatible LAN redirection facilities. These are generally not available in a heterogeneous system, with the result that most current LAN systems require that the computer and/or operating system at the workstations and the gateway be homogenous.

Also, the LAN workstations are effectively in full control of the switched hardware ports at the gateway. This virtually eliminates the possibility of implementing any flexible automatic and transparent support for regulated network attachments in the centralized gateway.

One area impacted is the regulation and certification required for attachment to particular WANs or switched networks. Examples of such regulation include various software timeout and frequency limit requirements for call activities, as well as hardware management schemes. Presently, the workstation software applications should be separately updated according to the periodically-issued CCITT recommendations and separately certified.

In addition, the workstation software applications must be aware of the types of modems attached to the gateway WAN ports, and should replicate specific software support to take advantage of distinct features for these various devices. Because these protocols cannot be implemented at the central gateway, manual configuration steps in the attachment process across all of the workstations are often required.

In order to emulate heterogeneity in systems without RPCs, translation mechanisms are also required to support incompatible data representations (e.g., big and little endian formats) and character sets (e.g., ASCII and various EBCDIC code pages) between the LAN workstations, the gateway and/or the modems. For example, character set support in the Novell-based LAN gateway is restricted to ASCII, and the word widths of the device driver interfaces are fixed.

While the current approach of redirecting the LAN device driver facilitates relatively fast single-message transfers across the LAN, this direct access also results in monopolization of these driver resources for effecting and maintaining a switched communications link for certain users while denying access to others.

Further, currently implemented LAN systems (such as the NACS Novell system) partition the available ports into one pool dedicated to incoming calls and a second pool dedicated to outgoing calls; that is, switched ports used to wait for incoming calls are separate from those used for outgoing calls.

Where one pool of ports is completely occupied, subsequent calls to the pool of assigned ports are simply rejected by typical device drivers. This partitioning of ports between incoming and outgoing calls in the LAN can result in the situation where LAN clients wanting to implement outgoing calls are refused connection, despite the idleness of some ports in the incoming pool. Similarly, call attempts that are received from the switched network have a more limited chance of actually being connected in the NACS system because only a subset of ports have been allocated for receiving incoming calls.

Monopolization of the communications hardware in the LAN device driver and gateway ports can lead to inconvenience for LAN users or, alternatively, higher overall system costs for additional ports in order to provide the desired level or port availability.

SUMMARY OF THE INVENTION

It is therefore an object of the present invention to provide a centralized server scheme to manage remote shared resources and to dispense with the constraints caused by the immediate and exclusive binding of the hardware resources for effecting switched communications to and from applications in distributed systems discussed above.

It is a further object of this invention to implement a gateway machine that would be useful in transparently and centrally enforcing regulation support for the LAN workstations for accessing WANs and other switched networks.

Accordingly, the present invention provides, in a distributed computer network having a gateway device with multiple switched communications ports and a remote procedure call facility, a mechanism for allocating communications links through the ports, comprising an interface mechanism for receiving remote procedure calls and returning a simulated message of a port before attempting to locate an available port.

The invention further provides a control mechanism for allocating hardware resources in a distributed system for implementing switched communications links between multiple users in the distributed system and remote servers in at least one external network, the distributed system including a gateway server having multiple switched communications ports, a device driver for directing communications across the distributed system and a facility for implementing remote procedure call communications in the distributed system. The control mechanism includes a pool of simulated return codes compatible with a remote procedure call request for a switched communication, means for issuing one of the simulated return codes in response to a remote procedure call to the gateway, first monitoring means for determining the availability of ports, second monitoring means for determining the necessity of physical port connection to the remote procedure call, and means for attempting port connection and returning a physical code.

The present invention is also directed to a method for allocating switched communications ports between multiple remote procedure calls in a distributed system gateway device, having the computer generated steps of generating code to return a virtual image of a hypothetical port in response to a new remote procedure call received at the gateway device, determining port availability for binding the new remote procedure call to a port, and generating a physical return code on determining port availability.

The method also preferably includes the step of returning to the gateway the code generated to return a virtual image for triggering a need for binding the remote procedure call to a port.

Preferably, the step of establishing port availability includes locating an idle port, opening the idle port, programming said idle port with a profile for the new remote procedure call, and attempting a switched communications call.

In the preferred method, the step of establishing port availability includes locating a sharable port, suspending a previous remote procedure call bound to the sharable port, and programming the sharable port with a profile for the new remote procedure call.

BRIEF DESCRIPTION OF THE DRAWINGS

FIGS. 8 and 9 are flow diagrams illustrating the procedures used for emulating outgoing and incoming switched calls in an experimental set-up of a machine utilising concurrent RPCs and virtual handles for a LAN gateway, according to the preferred embodiment of the invention.

DETAILED DESCRIPTION OF THE PREFERRED EMBODIMENTS

Figure 1:
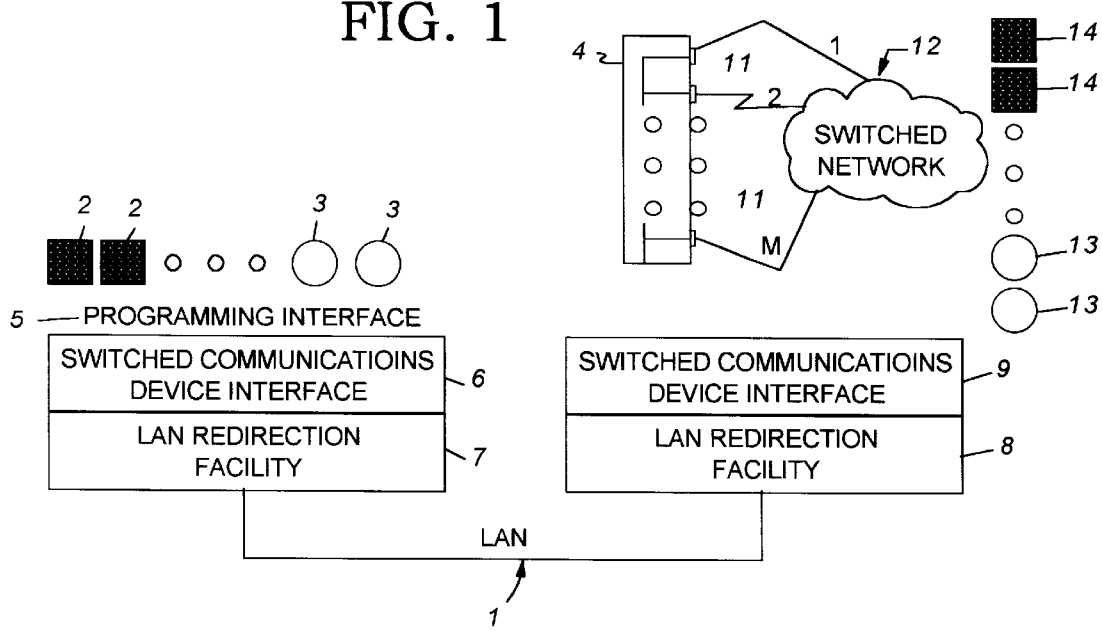
FIG. 1 is a schematic representation of a LAN network supporting a homogeneous computing environment of the prior art.

FIG. 1 illustrates a LAN, generally designated by 1, for a homogeneous computing environment, of the type of the Novell implementation described above.

A client machine 2 on the LAN 1 seeks to issue an outgoing call through the LAN gateway server 4 to a remote server 13 across a switched network 12, while another client machine 3 (also called a server to remote users across the switched network 12) entertains an incoming call from remote machine 14 received through the gateway server 4. (It should be recognised that a "client machine" is a client to the gateway running at least one application process, and may be attended or unattended by a human agent.)

Figure 3:
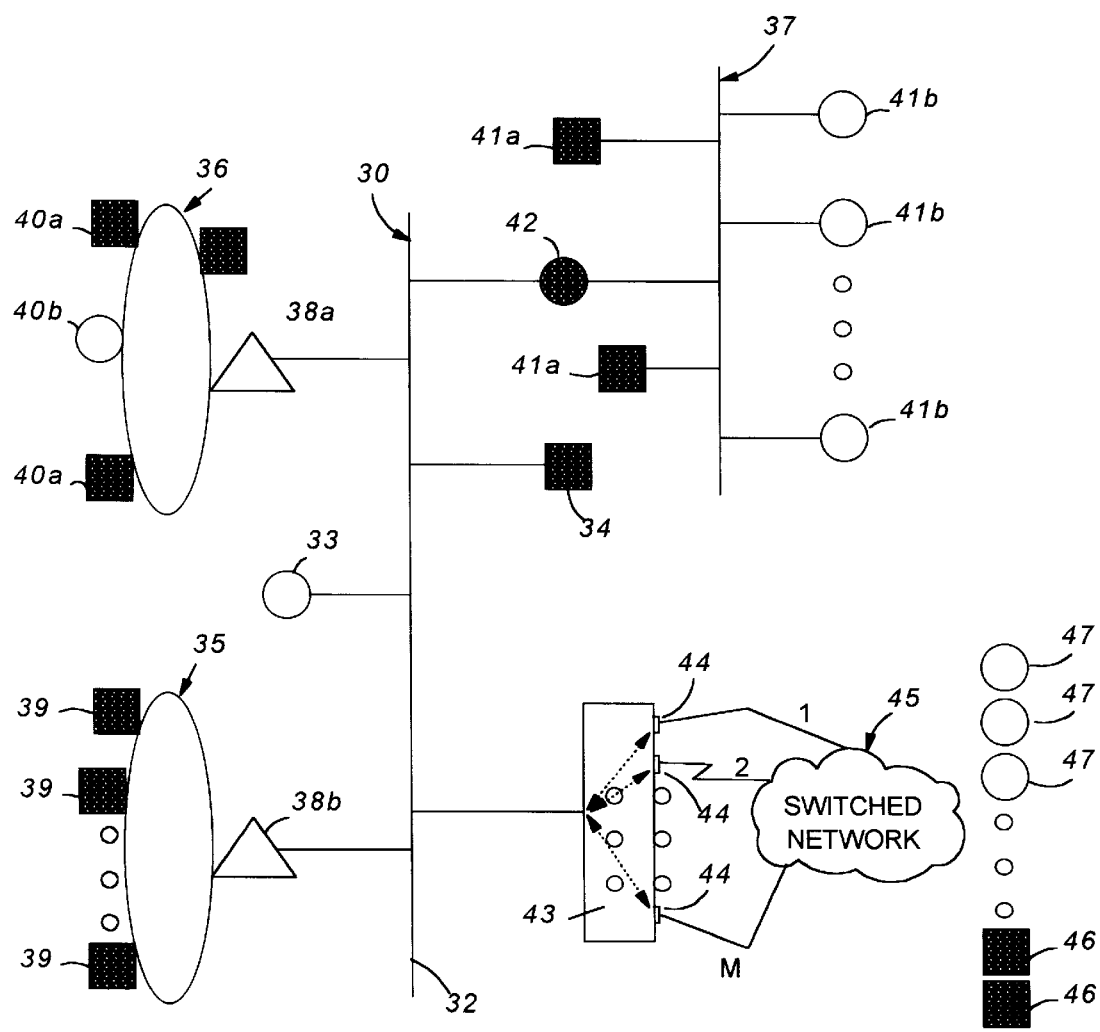
FIG. 3 is a schematic depiction of the target heterogeneous distributed environment and a switched communications network for a preferred embodiment of the present invention.

For simplicity, the following common coding has been used in FIGS. 1 and 3 to differentiate the active states of individual workstations and processors in both LANs and WANs: workstations/processors shown as shaded squares are intended to denote client machines issuing outgoing calls, while those depicted as unshaded circles are intended to denote server machines receiving incoming calls.

Ordinarily, the client machine 2 with the outgoing call issues a command through its programming interface 5 with the LAN 1 to implement a switched communications interface 6, that in turn connects to a LAN redirection facility 7 for redirecting the device driver commands over the LAN 1 to the parallel corresponding interface mechanisms 8 and 9 at the LAN gateway 4.

The gateway 4 contains a number (m) of switched communications ports 11 that can be linked to the switched communications network 12.

As the command for issuing an outgoing call from the user 2 is received from the LAN 1, the LAN redirection facility 8 and switched communications device interface 9 on the gateway 4 side of the LAN 1 include logic that channels the call command to the target port from the appropriate pool of ports.

An incoming call to the gateway 4 passes, in parallel fashion, through the switched communications device interface 9 and LAN redirection facility 8 on the gateway 4 side of the LAN 1 before crossing the LAN and passing through the communications interface layers 7 and 6 that complete the connection requested by the server machine 3.

Users 2 and 3 can be applications in the same (client) machine or different (client) machines.

In the NACS and NASI implementations of Novell, in the absence of a conversion interface written to the specific application (i.e., accessing a switched communications gateway), the user (2, 3) side and the gateway 4 side of the LAN must utilise a common operating system environment, that is, the LAN must be homogeneous.

In its DCE, OSF has addressed the homogeneity problem in LANs through the use of RPCs.

A schematic overview of the mechanism for implementing RPCs in a LAN, such as OSF's DCE, is shown in FIG.

2. The underlying network is transparent to the client and server programs. Although reference is generally made herein to LANs, since this is the predominant implementation, it should be noted that the present invention could also be implemented on a WAN.

Connectivity and interoperability between user workstations and servers that may be heterogeneous (i.e., utilising different computer hardware and/or operating system environments) are achieved using RPC interfaces to implement transparent communications across the heterogeneous distributed system, with the result that the RPCs appear to the client machine to be transparent local procedure calls.

Figure 2:
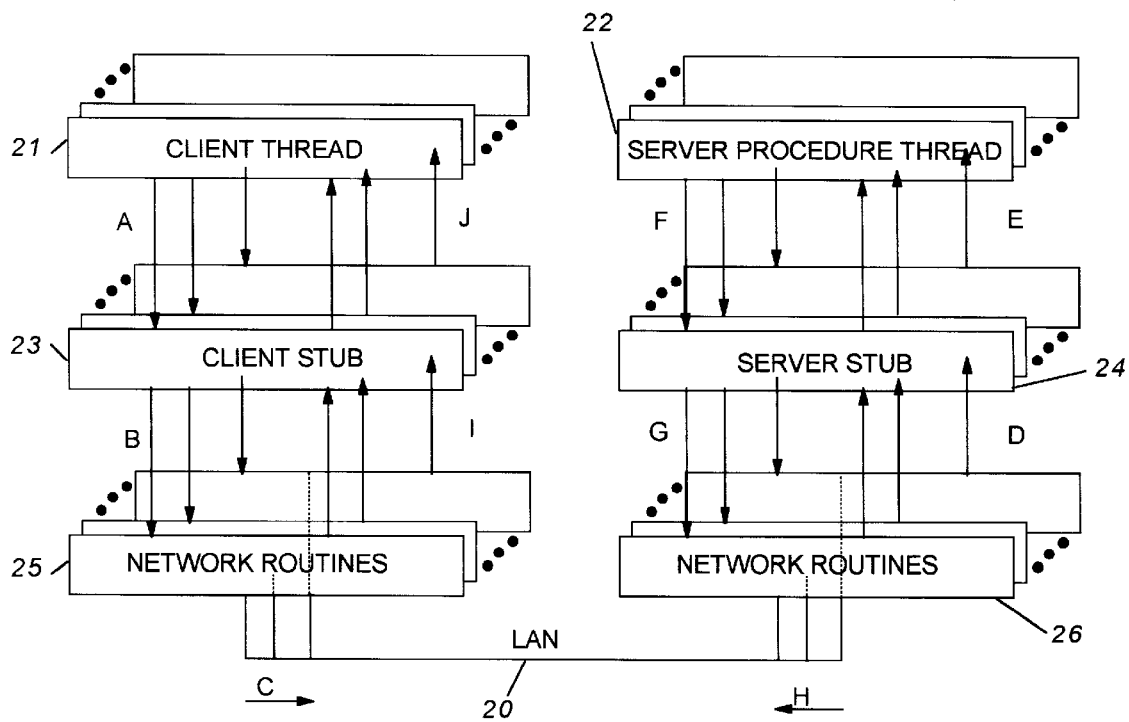
FIG. 2 is a schematic overview diagram illustrating the functional layers in an interface for implementing RPCs in a LAN.

The implementation of concurrent RPCs is illustrated in FIG. 2. A client workstation application thread 21 and server application thread 22 on opposite sides of a LAN 20 are shown, with the RPC interfaces 23 and 24 interleaved, in symmetrical fashion, between the client thread 21 and the network routines 25 for accessing the LAN hardware (device driver) on one side, and between the server 22 and network routines 26 on the other side. The client thread 21 and its RPC interfaces 23 and network routines 25 are generally implemented in one system, as are the server thread 22 and its RPC interfaces 24 and network routines 26. Through the transparency provided by RPCs, these systems may be disparate (i.e., separate and heterogeneous) or may reside on the same machine and perform in the same way.

The RPC issued from the client thread 21 to the server 22 is sent in the form of a request message (whether this is a remote processor or a server residing on the same machine as the sender), and the server is able to transparently receive the call, execute the procedure and return a reply message. Analogous to local procedure calls, the calling program in the user 21 waits until the called procedure returns. The sequence followed is designated, for greater clarity, by the letters a through j on FIG. 2.

Because remote procedures cannot have access to any variable or data values in the calling program's environment (since the procedure is executed in a disjoint address space), an interface compiler (not shown) is generally used as a basis for integration of RPCs into the respective operating system languages of the client 21 and server 22. The interface compiler replaces each call to a remote procedure in the client program by a call to a client stub procedure 23. This is the procedure in the client program that "stands-in" for the remote procedure in the server program. The task of the client stub 23 is to marshal the arguments and pack them up with the procedure identifier into a message, send the message to the server, and then await the reply message, (un)marshal it and return the results.

Before the server program is compiled, it too is processed by the interface compiler that checks the procedure definitions in the server against the interface specification, and generates a server stub 24 that obtains input arguments by (un)marshalling the request message, calling the appropriate server procedure, and when it returns, marshalling the output arguments (or in the case of a failure, an error report) and making a reply message which it sends back to the client.

Through the concurrency provided by multi-threading, several RPC procedures can be occurring simultaneously, in parallel, in the network. This is illustrated schematically in FIG. 2 with multiple instances of each schematic block.

In OSF's DCE, the RPC interfaces support (among other things):
1. network and transport protocols that may be connectionless or connection-oriented;
2. similar and dissimilar hardware and/or operating systems;
3. use of commonly-supported (networked) data types, regardless of the application programming language, machines' native data representations (e.g., big or little endian), or code page (e.g., ASCII and various EBCDIC code pages).
4. packing and unpacking of procedure input and output parameters (i.e., marshalling and unmarshalling) for transport across the network by software stubs; and
5. other related features, such as authentication of the applications involved, as well as authorizations for access to the various distributed resources within the network.

My U.S. Pat. No. 5,463,625 describes an extension of the RPC mechanism beyond the limits of a single distributed system by replacing the traditional system for effecting switched communications outside the LAN based on redirection of device driver commands with a high performance machine that utilises the RPC mechanism in a procedure for dynamically allocating and controlling the hardware resources used in effecting switched communications links between the distributed and possibly heterogeneous environments of LANs and WANs.

FIG. 3 schematically illustrates the architecture of an active heterogeneous LAN with a switched communications gateway server and is representative of the type of heterogeneous environment utilising multi-threading and RPCs in which the present invention is ideally implemented, although the communications management mechanism of the present invention is equally useable for managing switched communications from concurrent homogeneous distributed environments.

In FIG. 3, a LAN, generally designated by the numeral 30, consists of an electronic link 32 interconnecting single workstations 33 and 34, as well as different types of other local area networks 35, 36 and 37. As illustrated, networks 35 and 36 are examples of token ring LANs, and both networks 32 and 37 are examples of Ethernet LANs.

In the case of networks 35 and 36, an intelligent device, such as a router 38a and 38b, connect the multiple workstations/processors (generally denoted as 39 for network 35, and 40a and 40b for network 36) into the main LAN 32.

Network 37 connects workstations/processors 41a and 41b through a bridge 42 to the main LAN 32.

LAN applications may represent users that access remote server applications, such as users issuing outgoing calls. LAN applications may also represent services that are used by remote users and/or applications that initiate incoming calls from the remote side of the switched network.

A single gateway server 43 includes multiple ports 44 for linking the incoming and outgoing calls between users and servers in the LAN with remote users 46 and servers 47 across the outside switched network 45.

Figure 4:
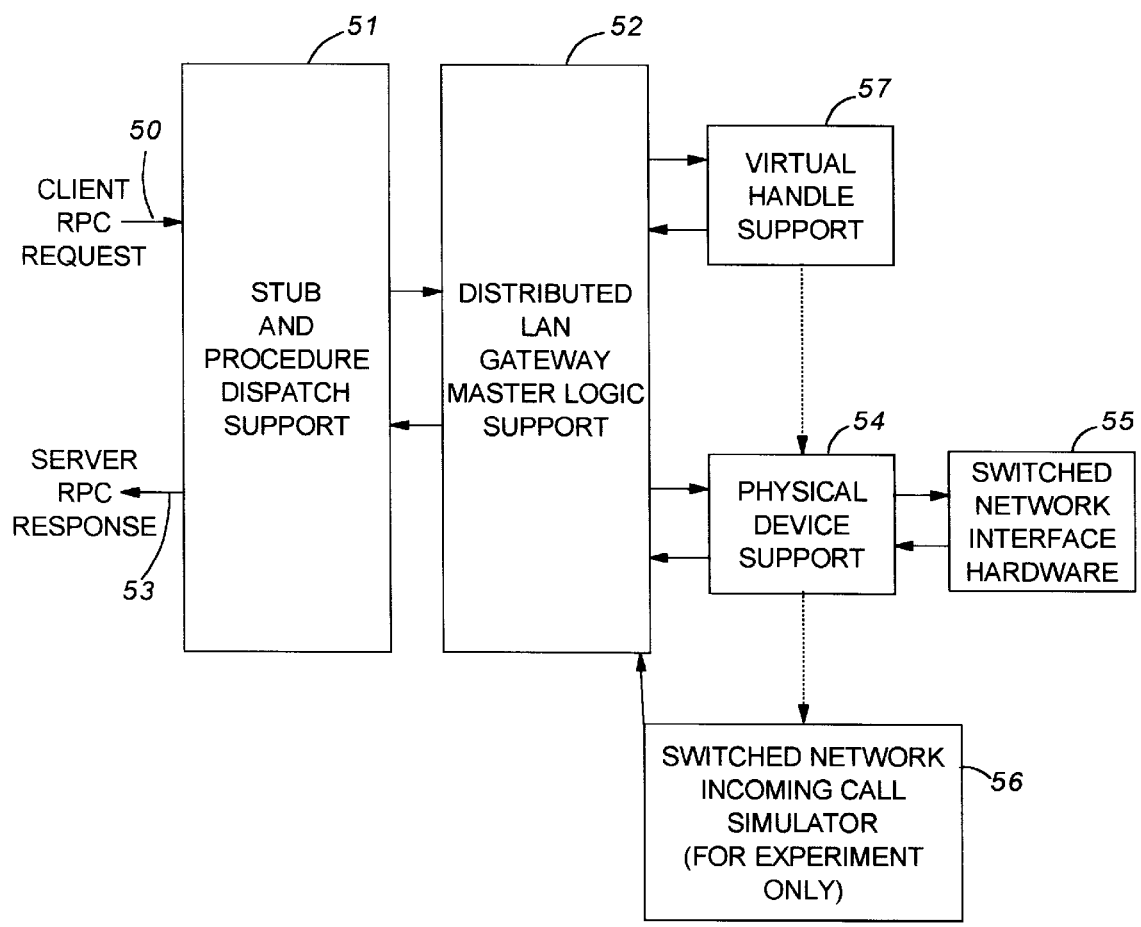
FIG. 4 is a block diagram of a gateway server implemented through remote procedure calls (RPCs) and virtual handles, according to the present invention.

As illustrated in FIG. 4, for an outgoing call through a switched LAN gateway, a client machine on a LAN issues an RPC 50 that goes through the client stub processing and network routines, as well as the LAN and the server network routines, as described earlier in relation to FIG. 2. The RPC arrives at the server stub 51 with attendant procedure dispatch support, as described above.

As described for the implementing the invention of my concurrently filed application, a message would be sent to the LAN Gateway Master Logic Support 52, which would locate and bind a physical port 54 for effecting the switched link 55, and return a physical handle (representing the specific physical port) to the client.

However, according to the present invention, the Gateway Master Support 52 first locates a virtual handle from the Virtual Handle Support 57 to provide to the client a software image of a hypothetical physical port, including appropriate return codes, until an idle physical port is necessary and can be located.

The virtual handles are taken from a pool, the number of which is not limited by the number of physical ports. Each virtual handle can only be occupied with one client at a time, a virtual handle located will communicate client-server context information without any dependency on the specific RPC implementations.

Thus, while the Master Logic Support basically implements the remote procedure and its overall function, it relies on the Virtual Handle Support to locate the properties (e.g., the port profile) associated with a virtual handle received from the client, to bind the client to the physical port and to identify the physical binding of a client's virtual port.

The Physical Device Support 54 is used to locate port objects in various states (e.g., without any bindings or with live connections), to point to the virtual handle of a client seeking to establish a switched link and to maintain a record of the number of "live" switched calls.

When the switched connection is established (e.g., an outgoing call has been successfully made), the reverse path is traversed (55 to 54 to 52 to 51 to 53) and the RPC response is sent back to the client.

A summary of the various standard functions related to switched communications links is set forth below. These functions are labelled with easily recognisable generic names and their usual operations briefly defined.

For understanding these functions, it should be recognised that in the DCE implementation, the LAN gateway maintains two data buffers for each DCE client; one buffer for maintaining data characters to be transmitted to the switched network on behalf of the client and the other for maintaining data characters that are received from the switched network for the client.

ReadData
  reads characters in the input buffer received from the switched communications network
FlushInput
  discards the characters in the input buffer of characters received from switched communications network
SendData
  appends characters to the output buffer for transmission to the switched network
SendBreak
  specifies that a break signal is to be sent to the switched network
TransImmediate
  expedites transmission of specified characters by-passing the output buffer
DrainOutput
  transmits all characters in the output buffer before returning
Flushoutput
  discards all characters in the output buffer
ReadEvent
  block thread until specified event(s) occur
PortOpen
  call for use of a communications port (returns a "handle")
PortClose
  discontinue use of resources associated with the specified handle
Program_Profile
  program communications port according to given input parameters
Read_Profile
  read current profile of port
Connect
  switched network connectivity request (requires automatic connection type for input or output, and, in the case of outgoing calls, requires switched network address, (i.e., telephone number)
Disconnect
  terminates switched communication
Disconnect_Answer
  terminates switched communication and automatically sets port back into call-receiving mode All of the foregoing operations except PortOpen are performed in relation to a particular actual "handle" (address, type, etc.) that is returned by the DCE gateway server after processing the PortOpen call.

When a "handle" is returned by the PortOpen RPC, the client machine does not know how this handle parameter is generated or how it may be used by the gateway server. As described in U.S. Pat. No. 5,463,625, the returned handle is derived from the Physical Device Support 53 (FIG. 4). It is a physical handle and represents an exclusive binding of the client to the target port 55.

However, in the present invention, the server gateway generates a unique virtual handle (from the Virtual Handle Support 52—FIG. 4) to identify the client that issues a PortOpen RPC. The virtual handle must be unique among all concurrent virtual handles, so that there is one virtual handle for each executed PortOpen that has not been followed up by a PortClose call.

Figure 5:
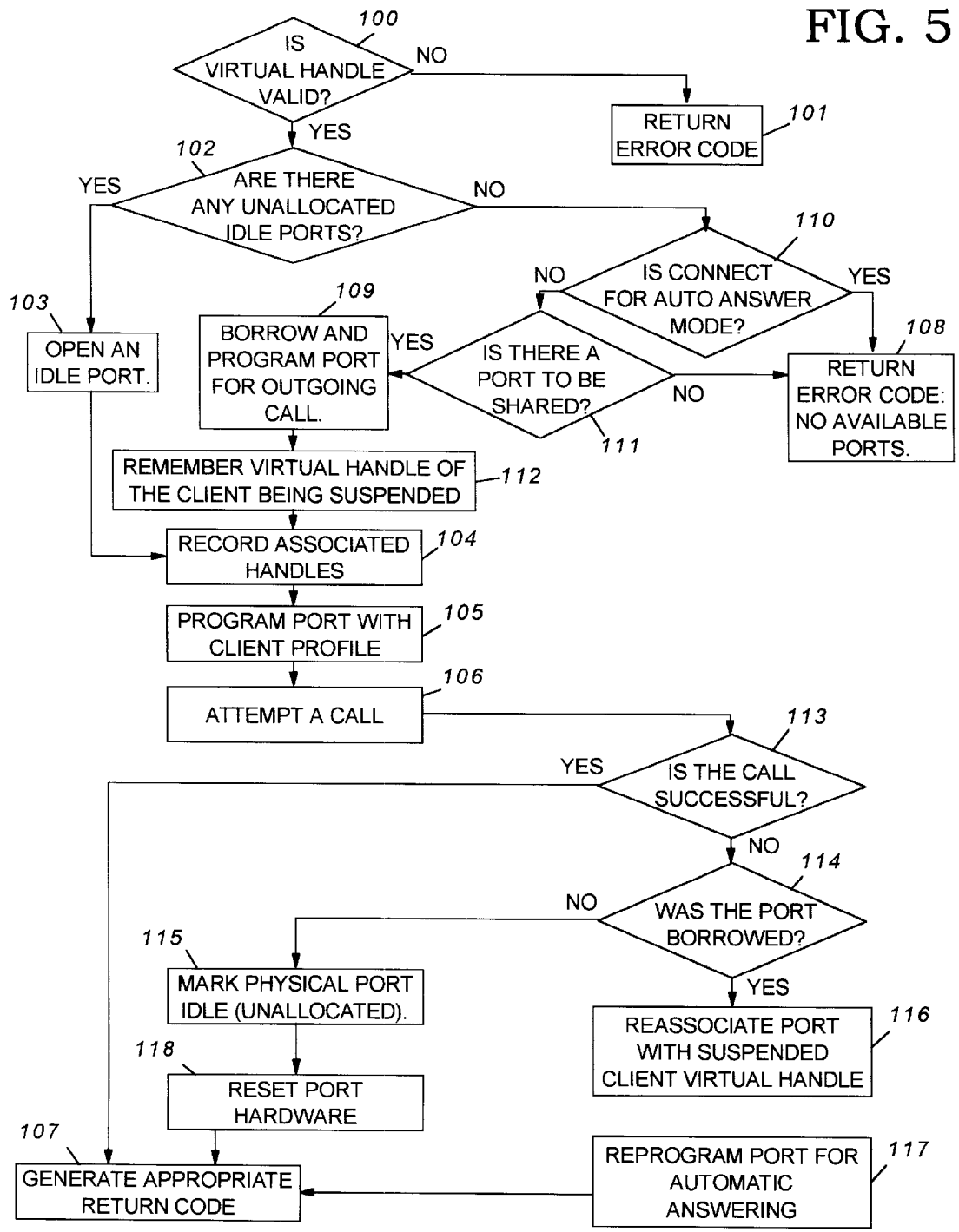
FIG. 5 is a flow diagram of the process for accessing a multiplexed switched communications port at a LAN gateway through virtual handles, according to the invention.

The processing of a Connect RPC is related to that of PortOpen, and a simple outline of the processing steps implemented on heterogeneous machines is illustrated in the flow diagram of FIG. 5. The validity of the virtual handle issued from the Virtual Handle Support must be determined 100, for all RPC functions other than PortOpen. Where the virtual handle is invalid, an error code is returned 101.

The gateway server generates handles that it returns to clients, and honours only those RPC requests (other than PortOpen) that return the previously dispensed handles.

In a further aspect of the present embodiment, the identities of clients can be further authenticated using the security features that are automatically provided within OSF's DCE.

Where the virtual handle is valid, the Master Logic Support determines whether there are any ports that can be opened 102, since other non-RPC applications at the server may have opened some of the ports. In the case of no other applications using the ports, this determination would still be made if fewer than the m ports had been opened by the RPC server.

Where available ports are located, a port is selected and opened 103, and the derived physical handle for the selected port is recorded against the virtual handle bound to the RPC 104. The presence of a physical handle indicates that the corresponding port has been Opened by the server. The virtual handle is associated with the physical handle of the port that it is bound to as shown to in block 104.

The selected port is then programmed with the client's profile (based on its virtual handle) 105 and a call attempted 106. A return code appropriate for the requested connection type and based on the results of the call attempt is subsequently generated 107.

Where no available ports are located and if the Connect RPC is for automatic answering mode 110 (i.e., asking for incoming calls), a return code is generated indicating that no ports are available 108.

If the RPC Connect request is for automatic outgoing call, and if there is a physical sharable port in the automatic answering mode 111, the physical port is selected and reprogrammed for outgoing calls 109. The association between this borrowed port and the client are established, and the procedure for attempting an outgoing call is followed, including recording associated handles 104, programming the port with the client profile 105 and finally attempting the outgoing call 106.

If the outgoing call attempt is successful 113, an appropriate RPC return code is generated 107. Otherwise, the previous state of the port is examined to determined whether the port is borrowed 114. If the port was idle before the present RPC, it is marked as idle or unallocated 115, it is then reset as an idle port 118 and a return code is generated 107. If the port was borrowed, it is reassociated with the previous client 116 suspended during the borrowing. On reassociation with the previous client, the port is reprogrammed for incoming calls 117, and the RPC of the client requesting an outgoing call is returned with a "failure" return code 107.

The reassociation set forth in blocks 116 and 117 are performed on any borrowed port upon intentional or abrupt disconnection of the outgoing call as well as upon failure to establish an outgoing call.

The present invention permits central reconfiguring through the Virtual Handle Support mechanism. One particular area where this can be used is in adding another parameter to the Connect RPC function. A parameter called a share-flag can be used by the client to specify whether it wants to allow for its port to be shared by other clients (ports to be borrowed for outgoing calls). For those clients who use the existing Connect RPC specifications as provided in the invention of my concurrent application (i.e., have no share flags), the Virtual Handle Support at the gateway server can use its own centrally configurable default behaviour.

Figure 6:
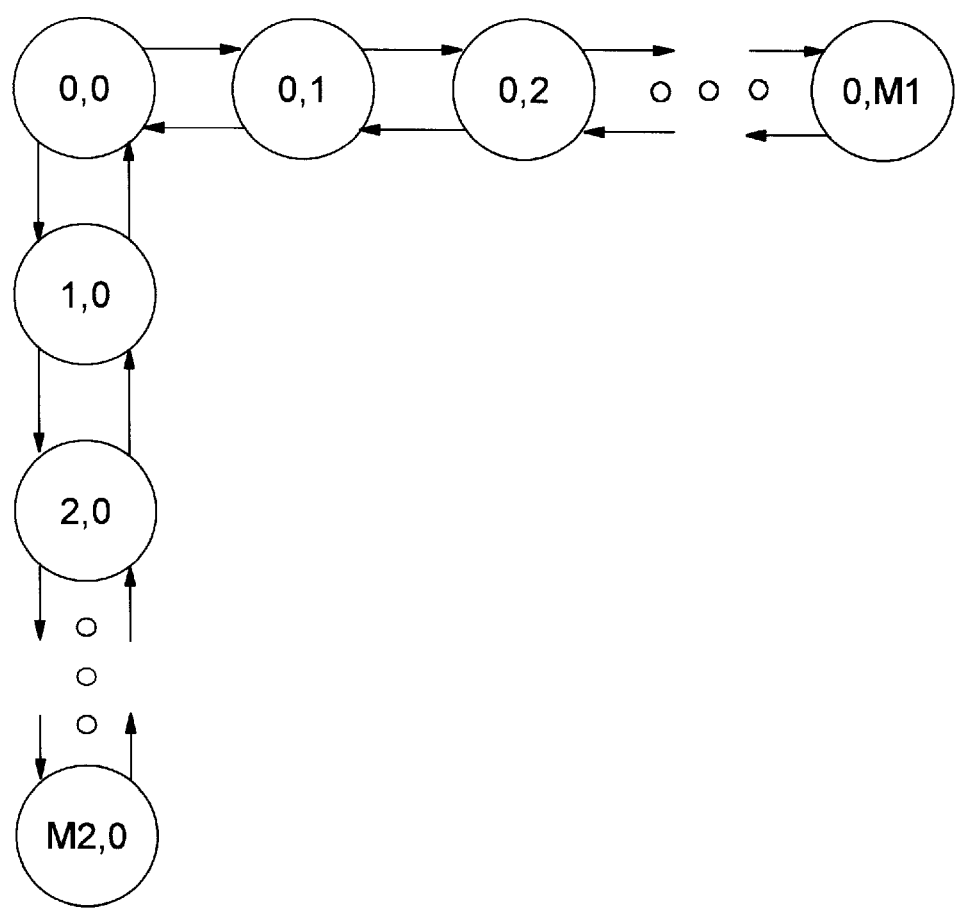
FIG. 6 is a Markov-type state diagram illustrating port capacity according to the prior art.
Figure 7:
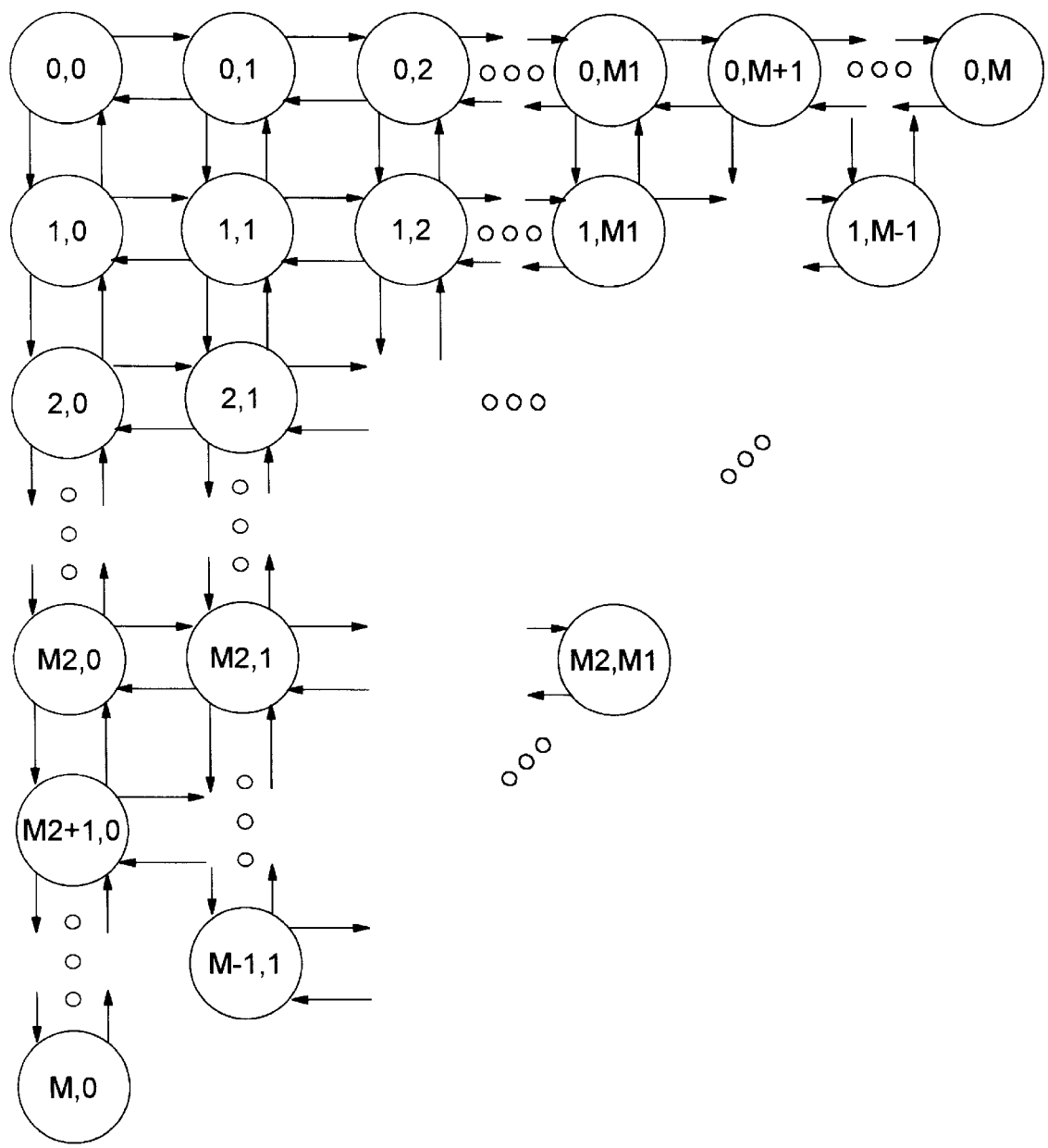
FIG. 7 is a Markov-type state diagram, similar to FIG. 5, illustrating port capacity according to the present invention.

A further aspect of the present invention is illustrated, by comparison, in FIGS. 6 and 7 that illustrate incoming and outgoing "live" calls in a system of the prior art (FIG. 6) and of the present invention (FIG. 7). In these figures, the first number in each circle represents the number of active incoming calls at any point in time, while the second number illustrates the number of outgoing calls active at the same point of time. Thus, the origin or "0,0" represents no active incoming or outgoing calls at that point in time, while "0,2" represents zero incoming calls and two outgoing calls at that point in time. Further, arrows pointing away from the origin illustrate call connections, while arrows pointing back to the origin illustrate call disconnections.

As previously discussed, in the common implementation of the Novell's NACS illustrated in the Markov-type state diagram of FIG. 6, the physical switched communications ports are segregated into two pools; one pool containing m1 ports for receiving incoming calls, and the other pool containing m2 ports for issuing outgoing calls from the switched network 12. Of course, the sum of m1 and m2 equals the total number of ports, m. As can be seen from FIG. 6, the number of outgoing calls calls possibly at any time is limited by the number of physical ports in the m1 pool because no use can be made of any idle ports in the other pool. Thus, LAN clients seeking to make incoming calls can be delayed where all of the m1 ports are in use, despite the idleness of ports in the m2 pool for receiving outgoing calls.

According to this further aspect of the present invention, the ports are capable of multiplexing, that is, can be programmed to issue outgoing calls or receive incoming calls as needed. The port directions and client associations are managed by the Virtual Handle Support 57 shown in FIG. 4 in the manner set forth in FIG. 5 that permit the "borrowing" of ports between RPCs. The result is the significant increase in potential call states at the gateway illustrated in FIG. 7.

This programming of port direction can be statically configured at initialisation time, or performed dynamically by the server, as requried.

EXPERIMENTAL SET-UP

In order to establish the workability of the proposed embodiment and to demonstrate its cost-efficiency over known LAN gateways, a prototype was set-up to simulate a LAN gateway environment. Some features included in the experimental set-up relate to my previously described concurrently filed application.

Three workstations running the Distributed Computing Environment (DCE) of the Open Software Foundation (OSF) on a LAN were used in this experimental set-up. One workstation was for clients issuing incoming switched calls, a second was for clients issuing outgoing switched calls and a third for running a server emulating a LAN gateway. Multiple threads within one process were used to simulate multiple clients.

The gateway server was configured to allow for multiple parallel executor threads (up to four times the number of assumed ports in the gateway). The threads were triggered by the scheduling of arrived RPCs for execution, and each thread could run a single RPC at a time.

It is also pointed out that in the case of the particular release of the OSF DCE implementation, only a fixed number of outstanding RPCs are permitted at the server at any one time due to hard-coded limits on the POSIX environment for which DCE is configured, although during the experiment, the number of RPC retries by clients never reached one percent for each RPC.

The clients simulating requests for incoming calls communicated with the gateway server over connection-oriented (TCP/IP—Transmission Control Protocol/Internet Protocol) LAN connections, while other clients (those issuing simulated outgoing calls) used datagrams (UDP/IP—User Datagram Protocol/Internet Protocol).

The server also collected statistics for analyzing the workability and efficiency of the proposed system.

A timer thread 56 (FIG. 4) was used to simulate incoming calls from a switched network to the server. Upon waking up by the system following a sleep time corresponding to interarrival of calls, this single thread looked up the status of ports. If it did not find a port waiting for an incoming call, it would then record a switched call "loss" to the Statistics Composition Support function; otherwise, it would notify the Master Logic Support to bind the switched call to an RPC client that is awaiting a call (in this case, an incoming switched call "success" is recorded).

Figure 8:
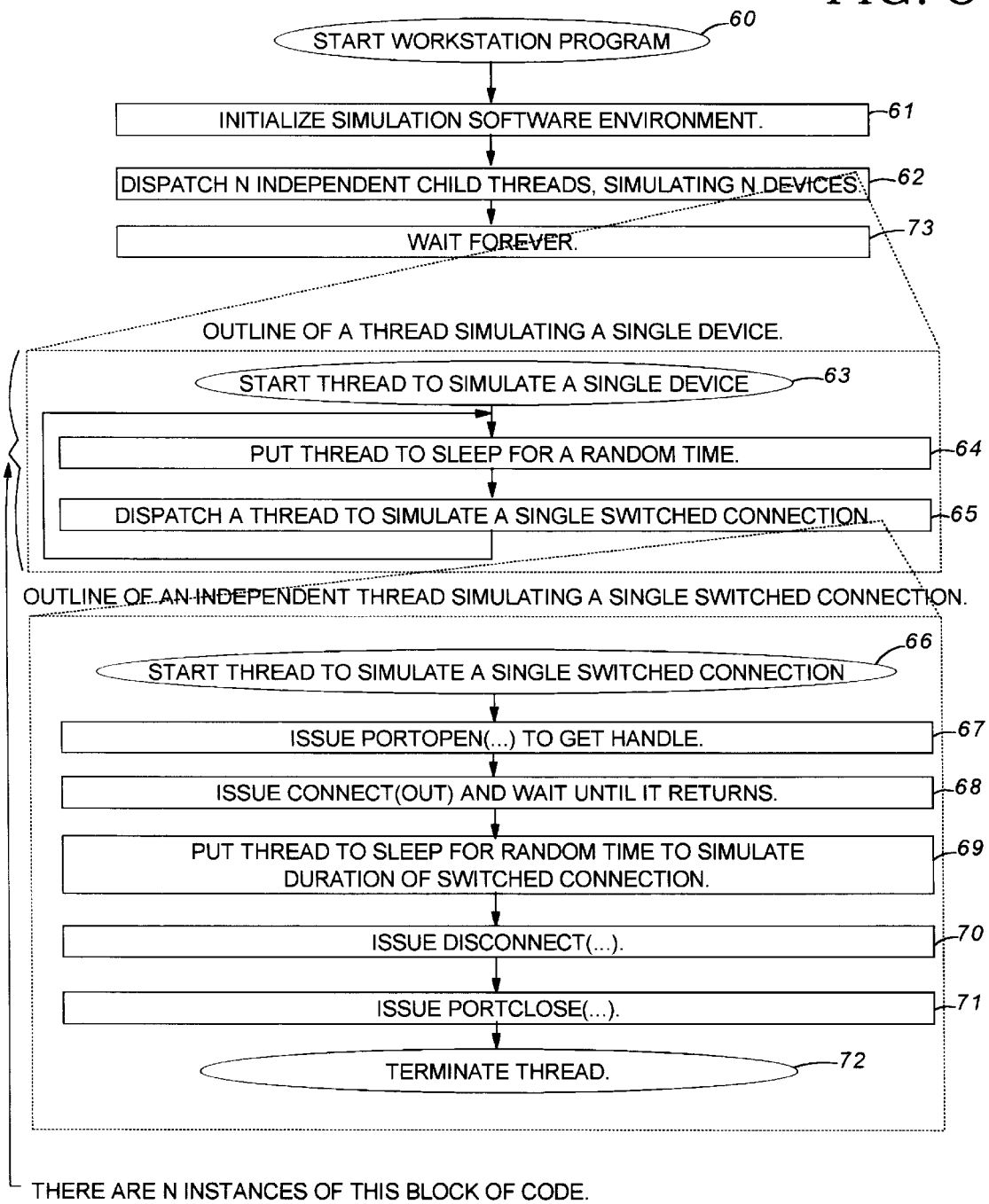

FIG. 8 illustrates the simulation of clients issuing outgoing calls. After starting the workstation 60, common variables and protocols were initiated 61. Multiple independent threads were issued 62 to simulated multiple user devices seeking to issue multiple outgoing calls through the gateway server. For each single simulated device started 63, the thread was put to sleep for a random period of time 64 to simulate the random access to the gateway's resources from a real LAN set-up.

After "waking" the device thread 65, a thread for sequential procedure calls for each thread simulating a single connection request was dispatched 66. A procedure PortOpen call was issued to the gateway server for each simulated client application thread.

The procedure call for each PortOpen command 67 issued by the client to the gateway server actually called a previously generated procedure stub. The call returned a virtual handle from the server. The client then issued a Connect(out) 68 to the gateway that returned when a simulated successful outgoing call was established. The procedure call thread was then "put to sleep" for a random period of time 69 (to simulate random connection time between the LAN workstation application and a remote server), after which Disconnect and PortClose commands 70 and 71 were sequentially issued with the same handle before the thread was terminated 72. The main thread continued throughout the experiment 73.

A simulation of an incoming call is illustrated in FIG. 9. After starting this workstation 74, common variables and protocols were again assigned 75, and multiple independent child threads (corresponding to the number of simulated ports) to simulate LAN servers for remote clients on a switched network, dispatched 76. Again, the main thread continued throughout the entire experiment 77.

After the start of each dispatched thread 78, a PortOpen call was issued to the gateway server to receive a virtual handle 79. Then, a Connect(in) message 80 was sent to the gateway server; this RPC returned when a simulated incoming call had been successfully established. The simulated LAN gateway server was configured to each Connect(in) RPC that it received as a sharable.

To simulate data transmission over the established switched link, the thread was "put to sleep" for a random period of time 81. After "waking", the thread issued a Disconnect_Answer command 82 to simulate the immediate reoccupation of a port after disconnect. This procedure was repeated several times in the course of the experiment.

When long duration runs on the experimental set-up were made, it was found that the high performance machine proposed herein effectively provided concurrency in establishing switched communications links through a LAN gateway server, freeing hardware resources of the LAN not immediately involved in maintaining the switched links.

The gateway interface of the present invention is described in this application in use in a specific type of LAN architecture. It will be clearly recognized, however, that with appropriate modifications that would be obvious from the present description to a person skilled in the art, that the interface is portable and may be adapted for connecting other types of area networks having similar gateway characteristics.

The embodiments of the invention in which an exclusive property or privilege is claimed are defined as follows:

1. In a shared media network system comprising a plurality of workstations, a gateway station having switched ports for communications between the workstations and an external network, and a shared transmission media for communications between the workstations and the gateway station, a method of allocating ports at the gateway station to the workstations for communication to the external network in response to requests from the workstations requesting access to a switched port, comprising the steps of assigning a virtual handle at the gateway to a request from a first workstation for allocation to the first workstation of a port having prescribed attributes and saving the attributes of the requested port at the gateway station in association with the virtual handle, transmitting the virtual handle to the first workstation, in response to a subsequent port connection request from the first workstation that contains the virtual handle, locating an idle one of the ports, programming the located port with the attributes associated with the virtual handle, establishing a connection between the first workstations and the idle one of the ports and transmitting a return code to the first workstation indicating successful establishment of the connection.

2. The method of claim 1 wherein the step of locating an idle port further comprises determining if the idle port is allocated to a second workstation, if the idle port is allocated to a second workstation, saving the virtual handle assigned to the second workstation for the port and preempting the allocation to the second workstation by programming the idle port with the attributes associated with the first workstation, and reprogramming the port with the attributes associated with the second workstation on completion of the connection associated with the first workstation.

3. The method of claim 2 wherein the request from workstations to the gateway station are performed by remote procedure calls from the workstations to the gateway station, wherein a remote procedure call includes a local client procedure at a workstation operating on behalf of other local procedures to issue requests for service to agent procedures at the gateway station in a fashion transparent to the local procedures.

4. For use in a shared media network system comprising a plurality of workstations, a gateway station having switched ports for communications between the workstations and an external network, and a shared transmission media for communications between the workstations and the gateway station, apparatus for allocating ports at the gateway station to the workstations for communication to the external network responsive to requests from the workstations requesting access to a switched port, comprising means for assigning a virtual handle at the gateway to a request from a first workstation for allocation of a port having prescribed attributes to the first workstation, means for transmitting the virtual handle to the first workstation, means for saving the attributes of the requested port at the gateway station in association with the virtual handle, means for locating an idle one of the ports responsive to a port connection request from the first workstation containing the virtual handle, means for programming the located port with the attributes associated with the virtual handle, means for establishing a connection between the first workstation and the idle one of the ports, and means for transmitting a return code to the first workstation indicating successful establishment of the connection.

5. The apparatus of claim 4 wherein the means for locating an idle port further comprises means for determining if the idle port is allocated to a second workstation, saving responsive to the determining means for preempting the allocation of the idle port to the second workstation, means activated after the preemption of the second workstation for programming the idle port with the attributes associated with the first workstation, and means for reallocating the port to the second workstation on completion of the connection associated with the first workstation.

6. The system of claim 5 wherein a workstation further comprises a client procedure for issuing requests to the gateway station as remote procedure calls.

7. The system of claim 6 wherein the gateway station further comprises a server procedure for receiving and processing requests issued from the workstations as remote procedure calls.

8. A gateway station for use in a distributed network system, wherein the network system comprises a plurality of workstations and the gateway station further comprises at least one input port for communicating with the workstations and a plurality of switched ports for communications with external networks, said gateway station comprising apparatus for allocating the ports to workstations responsive to requests from the workstations, said apparatus comprising means for transmitting a virtual handle from the gateway station to a first workstation responsive to a request from the first workstation for allocation of a port having prescribed attributes, means for saving the attributes of the requested port specified by the first workstation at the gateway station in association with the virtual handle, means for locating an idle one of the ports responsive to a port connection request from the first workstation containing the virtual handle, means for programming the located port with the attributes associated with the virtual handle, and means for transmitting a return code to the first workstation indicating successful establishment of the connection.

9. The apparatus of claim 8 wherein the means for locating an idle port further comprises means for determining if the idle port is allocated to a second workstation, means responsive to the determining means for preempting the allocation of the idle port to the second workstation, means activated by the preempting means for programming the idle port with the attributes associated with the first workstation, and means for reallocating the port to the second workstation on completion of the connection associated with the first workstation.

* * * * *